Patented May 5, 1942

2,281,584

UNITED STATES PATENT OFFICE 2,281,584

METHOD OF TREATING PROTEIN MATERIAL AND PRODUCTS PRODUCED THEREBY

Percy L. Julian, Maywood, and Elmer B. Oberg, Evanston, Ill., assignors to The Glidden Company, Cleveland, Ohio, a corporation of Ohio No Drawing. Application April 8, 1939, Serial No. 266,858

11 Claims. (Cl. 260—6)

The present invention relates to the preparation of plastics and particularly relates to a soy bean plastic having increased waterproof characteristics.

It has been proposed to treat soy bean meal and isolated soy bean protein with formaldehyde and use this material as a plastic. The use of the meal is preferable since it is cheaper and also preferable because of technical reasons, due to the presence of the bean fiber, and for other reasons. However, there are certain drawbacks to the use of the meal. For example, molded articles made employing the whole meal are not as water resistant as might be desired. Difficulty has also been encountered in recovering the excess formaldehyde used for treating the meal.

According to the present invention a process is provided whereby the difficulties of using whole meal are overcome without retention of all of the advantages of meal. The products produced show improved waterproofness and the difficulties of recovering the excess formaldehyde are overcome. The process also results in other economical and technical advantages which will appear as the description of the invention proceeds.

It has been found that the above mentioned difficulties encountered in the use of meal are due, in large part at least, to the presence of water soluble gums, sugars, glucosides and other water soluble constituents which are soluble in water at all pH values. When using the whole meal these water soluble ingredients go into solution in the formaldehyde, and when the excess formaldehyde is removed in the recovery process a syrupy caramelized mass is produced which almost negates the possibility of an economic recovery of the formaldehyde. Also since some formaldehyde solution is retained in the treated meal there will be a considerable amount of these water soluble constituents retained, and in addition the retained excess of formaldehyde increases the setting up a molding powder made with the treated meal and a phenolic resin, for example. Attempts to overcome the difficulty of recovering the formaldehyde by using only sufficient formaldehyde to effect the reaction are not satisfactory since all of the water soluble constituents are retained in the treated material.

It has been found that if these water soluble constituents are removed that an excellent plastic material may be produced without the difficulties attendant upon the use of the whole meal.

An excellent material for use in accordance with the present invention may be prepared by extracting the meal with water and then separating the extract from the insoluble residue. This residue, containing from about 35 to 45% protein is then treated with formaldehyde, either with or without first being dried. The reaction product may then be dried, powdered and mixed with a molding powder such as phenol-formaldehyde or urea-formaldehyde resin. The mixed molding powder is thermosetting and when molded under heat and pressure may be removed from the mold without cooling. The protein-formaldehyde complex alone is not thermosetting but is a thermoplastic permanently fusible material.

Accordingly 50 parts by weight of the dried formaldehyde treated residue or grits was ball-milled with 50 parts by weight of a mixture consisting of equal parts of phenol-formaldehyde molding resin and wood flour and then milled on heated rolls. This mixture was then used for molding spools, under heat and pressure, the technique being identical with that employed when using the molding powder of resin and wood flour alone. The mixture employed was thermosetting, and the spools were completely satisfactory.

The amount of molding resin used with the protein-formaldehyde complex may vary considerably, but where thermosetting properties are desired the amount will ordinarily exceed about 15% by weight of the protein formaldehyde complex. Also other molding resins than a phenol formaldehyde resin, may be used such as urea-formaldehyde resin. Other aldehydes than formaldehyde also may be used; both for treatment of the protein residue and for the preparation of the molding resin.

The protein residue treated with the aldehyde need not be that obtained from a water extraction of the meal as the insoluble residue obtained from other aqueous extractions may be employed. For example, an extraction with acidified water at a pH corresponding to the iso-electric point of the globulins present in the meal which will remove water soluble constituents found to be harmful may be employed, and the insoluble residue, containing the globulins, then treated with formaldehyde. Or an aqueous alkaline extraction may be employed. The use of the residue remaining after a water extraction of the meal is desirable from an economic point of view. By using such a material, it is possible not only to recover isolated protein from the water extract, but to also use the residue or grits remaining after the extraction. The use of these grits in the manner contemplated by the present invention thus fits in very well with an economical use of the bulk of the material present in the original meal and at the same time permitting the isolation of practically all of the globulins present in the meal.

The use of the insoluble residue for treatment with formaldehyde has many advantages. Any excess formaldehyde is readily recovered and may be reused several times, since the coloring ingredients are greatly reduced. Or when using only sufficient formaldehyde to effect the desired reaction, the reaction product is not contaminated with a high percentage of water soluble constituents. Moreover, the residue treated contains in any case nearly as high a percentage of protein as the original meal. The percentage of material soluble in water at all pH values in the original meal is nearly 30% and even when removing the globulins, the percent protein in the residue will be nearly equal to that in the original. For example, the residue obtained by extracting a meal containing 47.5% protein with alkali contained 40% protein. Preferably, the residue used is that obtained after removal of globulins by either water, alkali or other solvent therefor.

The term "water soluble constituents" as used in the specification and claims is intended to mean those constituents of the soybean meal which are soluble in aqueous solution at substantially all pH values. That is, it is intended to refer to those ingredients which are removed by means of any aqueous media, and is not intended to include the globulins, which are soluble in aqueous media both above and below the iso-electric point of the globulins, but not at this iso-electric point.

Having described the invention what is claimed is:

1. A molding powder in which the binder consists of a molding resin selected from the class of phenol-aldehyde and urea-aldehyde resins and the reaction product of an aldehyde with the insoluble residue remaining after treatment of soybean meal with an aqueous medium to remove water soluble constituents present in the meal.

2. A molding powder in which the binder consists of a molding resin selected from the class consisting of phenol-aldehyde and urea-aldehyde resins and the reaction product of an aldehyde with the insoluble residue remaining after extraction of the water soluble constituents and the globulin from soybean meal.

3. A molding powder in which the binder consists of a molding resin selected from the class consisting of phenol-aldehyde and urea-aldehyde resins and the reaction product of an aldehyde on the insoluble residue remaining after the aqueous extraction of constituents of soybean meal soluble at a pH corresponding to the iso-electric point of the globulins present in the meal.

4. The molding powder of claim 2 in which the molding resin is a phenol-formaldehyde resin and the aldehyde reacted with the residue is formaldehyde.

5. The molding powder of claim 2 in which the molding resin is a urea-formaldehyde resin and the aldehyde reacted with residue is formaldehyde.

6. The process of preparing a molding powder which comprises reacting an aldehyde with the residue remaining after extraction of the water soluble constituents from soybean meal, and preparing a mixture of the dry powdered reaction product with a powdered molding resin selected from the class consisting of phenol-aldehyde and urea-aldehyde resins, to produce a molding powder in which the binder consists of said reaction product and said resin.

7. The process of preparing a molding powder which comprises reacting an aldehyde with the residue remaining after extraction of the water soluble constituents and the globulins from soybean meal, and preparing a mixture of the dry powdered reaction product with a powdered molding resin selected from the class consisting of phenol-aldehyde and urea-aldehyde resins, to produce a molding powder in which the binder consists of said reaction product and said resin.

8. The process of preparing a molding powder which comprises reacting an aldehyde with the insoluble residue remaining after extraction of soybean meal with an aqueous medium at a pH corresponding to the iso-electric point of the globulins present in the meal, and preparing a mixture of the dry powdered reaction product and a powdered molding resin selected from the class consisting of phenol-aldehyde and urea-aldehyde resins, to produce a molding powder in which the binder consists of said reaction product and said resin.

9. A molded article resulting from molding under heat and pressure a molding mixture employing the molding powder of claim 1.

10. A molded article resulting from molding under heat and pressure a molding mixture employing the molding powder of claim 2.

11. A molded article resulting from molding under heat and pressure a molding mixture employing the molding powder of claim 3.

PERCY L. JULIAN.
ELMER B. OBERG.